(12) United States Patent
Fukuba et al.

(10) Patent No.: US 8,403,220 B2
(45) Date of Patent: Mar. 26, 2013

(54) OPTICAL CODE DETECTION WITH IMAGE EXPOSURE CONTROL

(75) Inventors: Ken Fukuba, Saitama Pref. (JP);
Satoshi Komi, Saitama Pref. (JP);
Takashi Sampei, Saitama Pref. (JP);
Tokuma Yamazaki, Saitama Pref. (JP)

(73) Assignees: Optoelectronics Co., Ltd. (JP);
Opticon, Inc., Renton, WA (US)

( * ) Notice: Subject to any disclaimer, the term of this patent is extended or adjusted under 35 U.S.C. 154(b) by 0 days.

(21) Appl. No.: 13/120,317

(22) PCT Filed: Oct. 27, 2008

(86) PCT No.: PCT/US2008/081298
§ 371 (c)(1),
(2), (4) Date: Apr. 29, 2011

(87) PCT Pub. No.: WO2010/036277
PCT Pub. Date: Apr. 1, 2010

(65) Prior Publication Data
US 2011/0210174 A1 Sep. 1, 2011

Related U.S. Application Data

(60) Provisional application No. 61/099,666, filed on Sep. 24, 2008.

(51) Int. Cl.
*G06K 7/10* (2006.01)
(52) U.S. Cl. .............. 235/455; 235/462.01; 235/462.11; 235/454
(58) Field of Classification Search ................. 235/455, 235/462.01, 462.11, 454
See application file for complete search history.

(56) References Cited

U.S. PATENT DOCUMENTS

| | | | | |
|---|---|---|---|---|
| 5,902,986 A | * | 5/1999 | Barkan et al. | 235/462.25 |
| 6,193,157 B1 | * | 2/2001 | Dickson et al. | 235/462.01 |
| 6,340,114 B1 | * | 1/2002 | Correa et al. | 235/462.22 |
| 6,478,225 B1 | * | 11/2002 | Swartz et al. | 235/462.22 |
| 2004/0118919 A1 | * | 6/2004 | Breytman et al. | 235/454 |
| 2004/0222301 A1 | | 11/2004 | Willins et al. | |
| 2006/0113386 A1 | | 6/2006 | Olmstead | |
| 2006/0180670 A1 | | 8/2006 | Acosta et al. | |
| 2009/0159683 A1 | * | 6/2009 | Roquemore et al. | 235/462.11 |
| 2009/0166426 A1 | * | 7/2009 | Giebel et al. | 235/462.42 |
| 2010/0294839 A1 | * | 11/2010 | Kawashima et al. | 235/455 |
| 2010/0314448 A1 | * | 12/2010 | Thuries et al. | 235/462.24 |

OTHER PUBLICATIONS

International Preliminary Report on Patentability, dated Apr. 7, 2011 of International Application No. PCT/US08/081298, filed: Oct. 27, 2008.
International Search Report and Written Opinion, dated Dec. 24, 2008, of International Application No. PCT/US08/081298, filed: Oct. 27, 2008.

* cited by examiner

*Primary Examiner* — Allyson Trail
(74) *Attorney, Agent, or Firm* — Kaplan Breyer Schwarz & Ottesen, LLP (57) ABSTRACT

In an optical code detection system and method, infrared pulses are utilized to detect the presence of an object within the range of an optical imaging device, but the image of an infrared pulse reflected from the object is also analyzed to determine the distance between the object and the imaging device. An illumination pulse is then produced to illuminate the optical code on the object, and the characteristic of that pulse, such as duration, are controlled to provide appropriate exposure for an object at the detected distance.

21 Claims, 7 Drawing Sheets

OPTICAL CODE DETECTION WITH IMAGE EXPOSURE CONTROL

The present patent application is the U.S. national stage of International Application No. PCT/US08/081,298, which was published in English on Apr. 1, 2010 under Publication No. WO 2010/0036277 A1. The disclosure of the International Application is hereby incorporated by reference in its entirety.

BACKGROUND OF THE INVENTION

The present invention relates generally to optical code detection and reading systems and, more particularly, concerns an optical code reading system and method which provide adaptive exposure control.

Anyone who has shopped in a modern supermarket is familiar with optical code imaging devices, which facilitate rapid checkout by scanning bar codes imprinted on product packages. This is a relatively undemanding application of bar code reading, as a package is essentially brought to a standstill by the operator for purposes of scanning the bar code.

More recently, optical code readers have been utilized in production lines where items are assembled, where they are inspected, where they are packaged, and the like. This application of optical code reading is far more demanding, as products move down a production line at a relatively high speed, for example, on a conveyor belt. In order to avoid the creation of a bottle neck on the production line, it is therefore important that accurate decoding of optical codes take place without reducing the speed at which the objects move down the production line. The speed at which an optical code can be decoded accurately therefore becomes a primary concern.

For purposes of explanation herein, imaging devices may include imaging devices, CCD imaging devices, CMOS imaging devices, and other devices for capturing the image.

Figure 1:
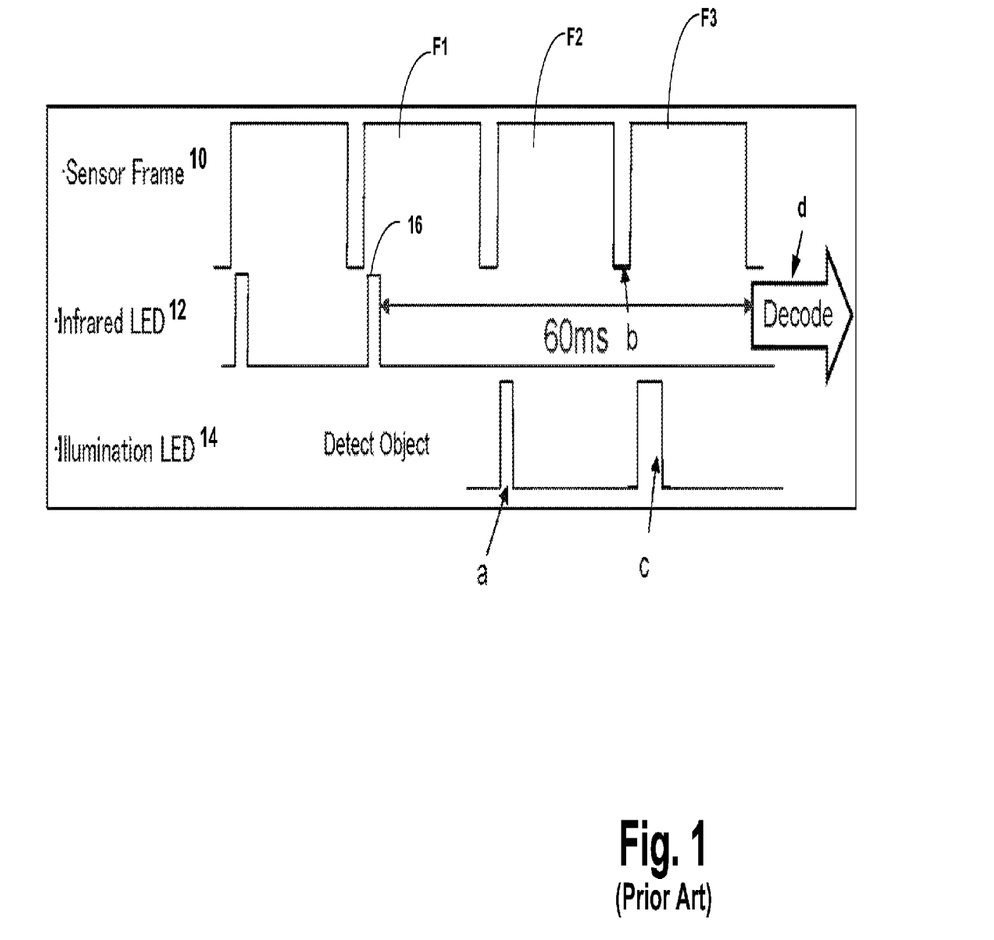
FIG. 1 is a timing diagram illustrating the operation of a typical, existing high speed optical code imaging device.

FIG. 1 is a timing diagram illustrating the operation of a typical, existing high speed optical code reader or imaging device. The imaging device creates an image of a scanned optical code on an imaging sensor, and that image is then decoded to recover the optical code. A sensor frame signal 10 defines the periods of time (frames, e.g. F1, F2, F3) during which an image may be detected and acquired. The imaging device produces pulses of infrared LED illumination 12 and visible light illumination 14.

When the image sensor senses a reflection of an infrared light pulse 16 in a frame F1, this is an indication that the presence of an object has been detected within the operating range of the imaging device. Thereafter, a first illumination pulse a is emitted during sensor frame F2, and a first image is captured at b. The exposure of this image is then evaluated, and a second illumination pulse c is emitted in the following sensor frame F3. The width of that pulse is calculated to produce a properly exposed image during frame f3 this will result in the optical code being decoded at d, with a high reliability. Typically, it now takes at least 60 ms for the optical code to be decoded.

SUMMARY OF THE INVENTION

In accordance with one aspect of the present invention, infrared pulses are utilized to detect the presence of an object within the range of an optical imaging device, but the image of an infrared pulse reflected from the object is also analyzed to determine the distance between the object and the imaging device. An illumination pulse is then emitted to illuminate the optical code on the object, and the characteristic of that pulse, such as intensity or duration, are controlled to provide appropriate exposure for an object at the detected distance. This effectively provides a variable image depth of field, which improves reliability and speed of decoding.

It is a feature of the present invention that proper exposure of an optical code can be obtained in the first instance, resulting in the reduction of total decoding time below 40 ms.

BRIEF DESCRIPTION OF THE DRAWINGS

The foregoing and other objects, features and advantages of the present invention will be understood more completely from the following detailed description of a presently preferred, but nonetheless illustrative, embodiment in accordance with the present invention, with reference being had to the accompanying drawings, in which:

FIG. 5, comprising FIGS. 5(A), and 5(B), illustrates a preferred method of estimating the distance between the object and the imaging device, with FIG. 5(A) schematically representing the object positioned at three different distances a, b, and c (50 mm, 100 mm and 150 mm, respectively), and FIG. 5(B) depicting the image of the reflected infrared radiation (a spot) obtained at each of the positions a, b, and c (from left to right);

DETAILED DESCRIPTION OF THE PREFERRED EMBODIMENT

Figure 2:
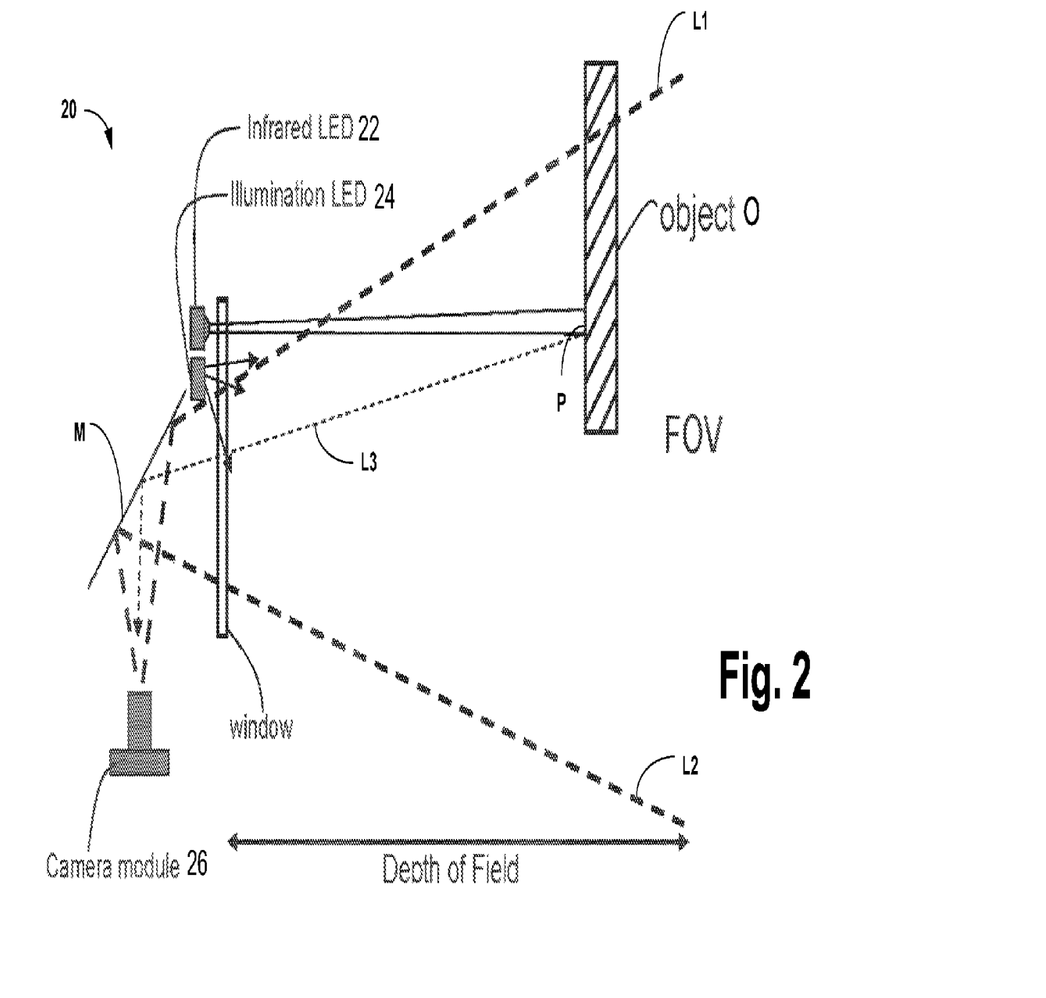
FIG. 2 is a schematic representation of a system embodying the present invention.
Figure 3:
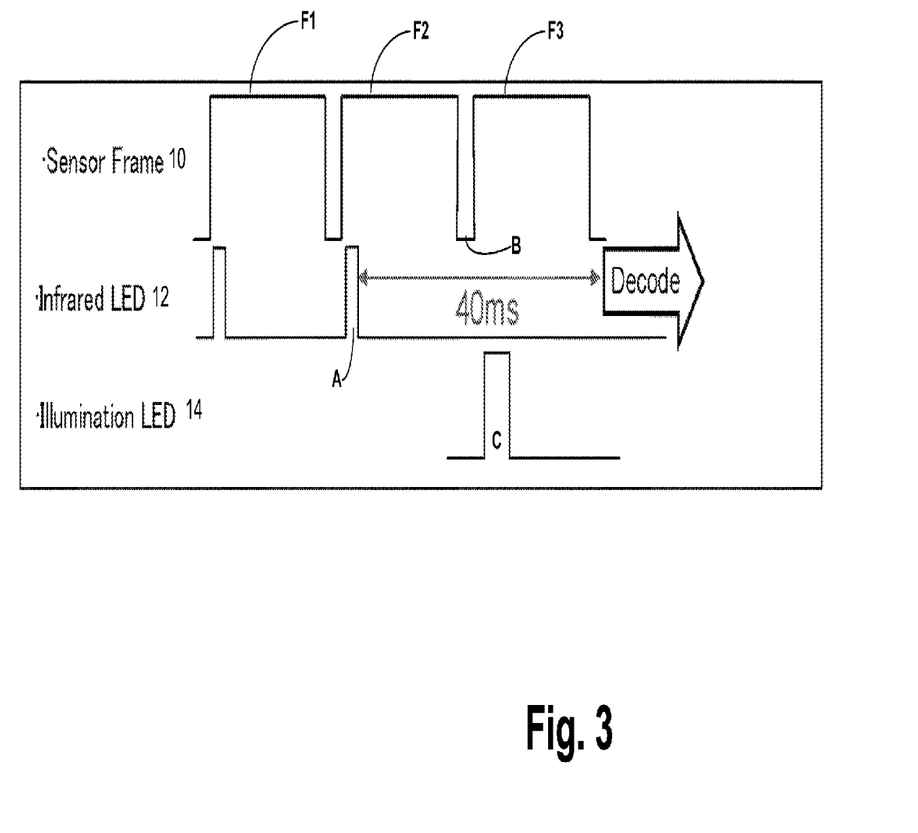
FIG. 3 is a timing chart useful in describing the operation of system 20 of FIG. 2.

Turning now to the drawings, FIG. 2 is a schematic representation of an optical imaging device system 20 embodying the present invention. FIG. 3 is a timing chart useful in describing the operation of system 20 of FIG. 2, and FIG. 4 is a flow chart, also useful in describing the operation.

As may be seen in FIG. 2, system 20 includes an infrared light emitting diode (LED 22), which emits infrared radiation and an illumination LED 24, which emits visible light. Radiation from LEDs 22 and 24 is directed at a face of an object O, which bears an optical code, preferably in an area above a point P where the infrared radiation impinges. A camera module 26 having a field of view FOV defined by the lines L1, L2 monitors object O through a mirror M. Line L3 represents an image of point P reflected from object O to camera module 26.

Figure 4:
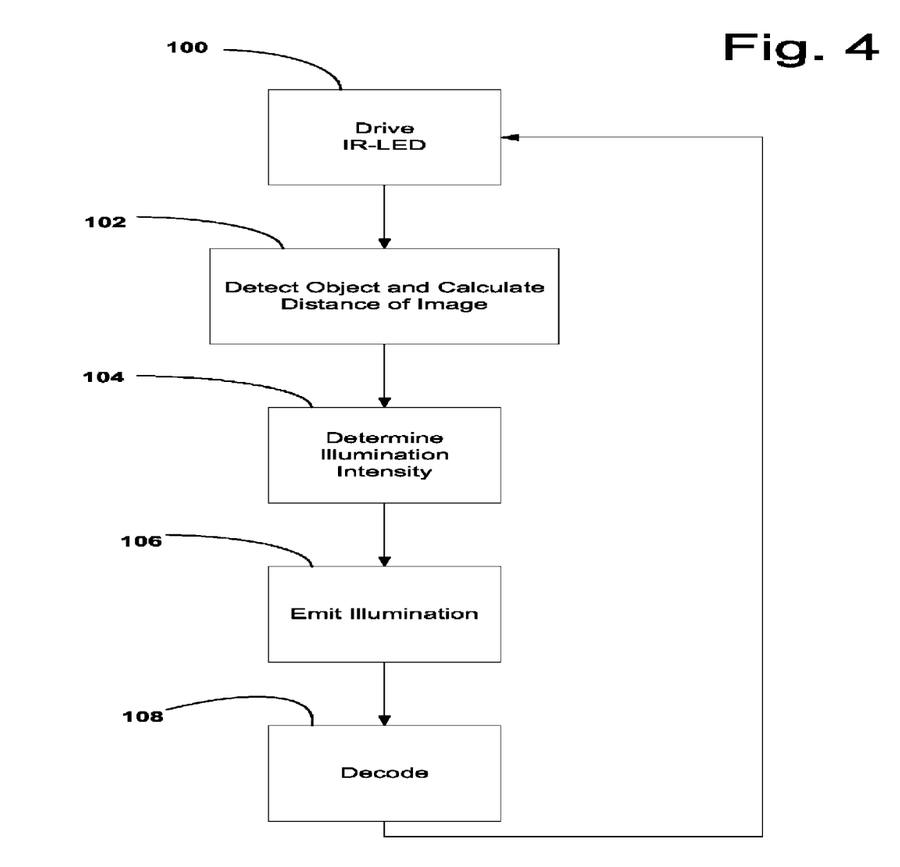
FIG. 4 is a flow chart useful in describing the operation of system 20 of FIG. 2.

In operation, as represented by block 100 in the flow chart of FIG. 4, the infrared LED 22 is pulsed during a sensor frame F2 and, when the image of point P is detected in camera module 26, a determination is made at A that an object is present, and estimation of its distance from system 20 is initiated (block 102). Upon completion of frame F2, it is determined at B what the appropriate illumination should be for object O (block 104), based upon the previous determination of the distance between object O and system 20. In the following frame F3, a pulse producing the appropriate illumination (intensity and duration) is emitted at C (block 106). With the appropriate illumination, the optical code is decoded with a high probability of success, upon completion of frame F3 (block 108). Thereafter, the charge stored in the image sensor may be erased, and control returns to block 100, to permit decoding of the code on the next object.

Figure 5:
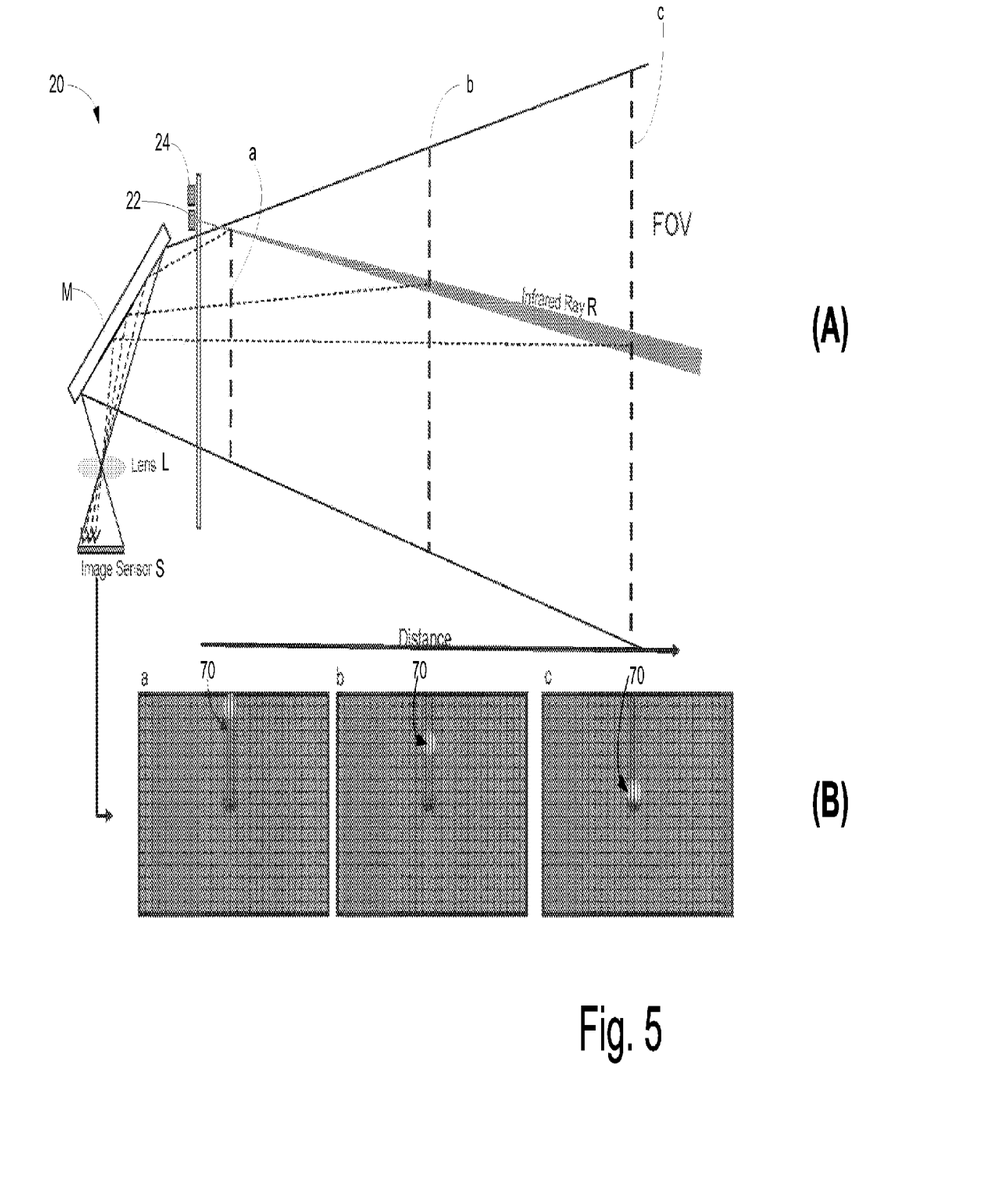

FIG. 5, comprising FIGS. 5(A), and 5(B), illustrates a preferred method of estimating the distance between the object and the imaging device, with FIG. 5(A) schematically representing the object positioned at three different locations a, b, and c (50 mm, 100 mm and 150 mm, respectively), and FIG. 5(B) depicting the image of the reflected infrared radiation (a spot) obtained at each of the positions a, b, and c (from left to right).

FIG. 5(A) is similar to FIG. 2, except it depicts the object O at three different distances a, b, and c from the imaging device (50 mm, 100 mm and 150 mm, respectively). As may be seen, the infrared ray R impinges on the object O at different heights at the positions a, b, and c. The reflections of the ray R from the object are represented by broken lines in FIG. 5(A). The reflected beams reflect off of mirror M and pass through a lens L, which forms an image of ray R on an image sensor S (lens L and image sensor S are part of camera module 26 of FIG. 2). The image of the ray R on image sensor S is a spot 70 within an otherwise dark area, and as may be seen in FIG. 5(B), the spot 70 is at different heights in the image, because the beam impinges on the object at different heights in each of positions a, b, and c (imaged from left to right, respectively).

In practice system 20 would be calibrated to place the spot 70 at the top of the image formed on sensor S when object O is at the nearest position to be measured. Thereafter, the distance between object O and sensor S can be estimated, based upon the height of spot 70 in the image. Those skilled in the art could readily program this function into the system electronics or into a look up table.

Figure 6:
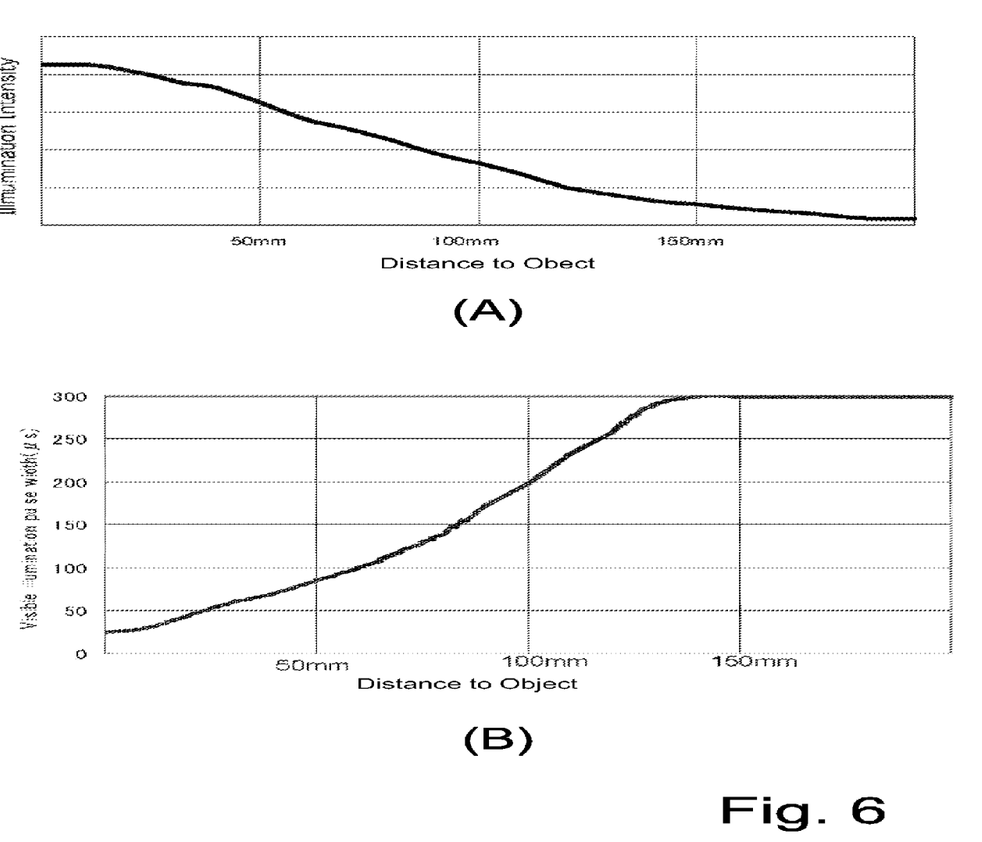
FIG. 6(A) is a graph showing how the intensity of the emitted visible illumination decreases with the distance between the object and imaging device.
FIG. 6(B) is a graph illustrating a preferred method for adjusting visible illumination based upon the distance between the object and imaging device.

Once the distance between the object and the imaging device is determined, the visible illumination provided to form a well exposed image can be controlled accordingly. FIG. 6(A) is a graph showing how the intensity of the emitted visible illumination decreases with the distance between the object and imaging device. Basically, illumination varies inversely with the square of the distance. Therefore, more light must be provided to the object as its distance increases.

In the preferred embodiment, illumination is adjusted by controlling the duration of the pulse of visible illumination in relationship to the determined distance between the object and the imaging device. FIG. 6(B) is a graph illustrating a preferred method for adjusting visible illumination based upon the distance between the object and imaging device. As may be seen, the width of the pulse of illumination is increased with the distance between the object and imaging device. Preferably, the duration of the pulse is kept at a constant value when the distance exceeds a threshold value, 140 mm in the preferred embodiment. Those skilled in the art will appreciate that it would also be possible to control the pulse's intensity or both its intensity and duration to achieve desired illumination.

Figure 7:
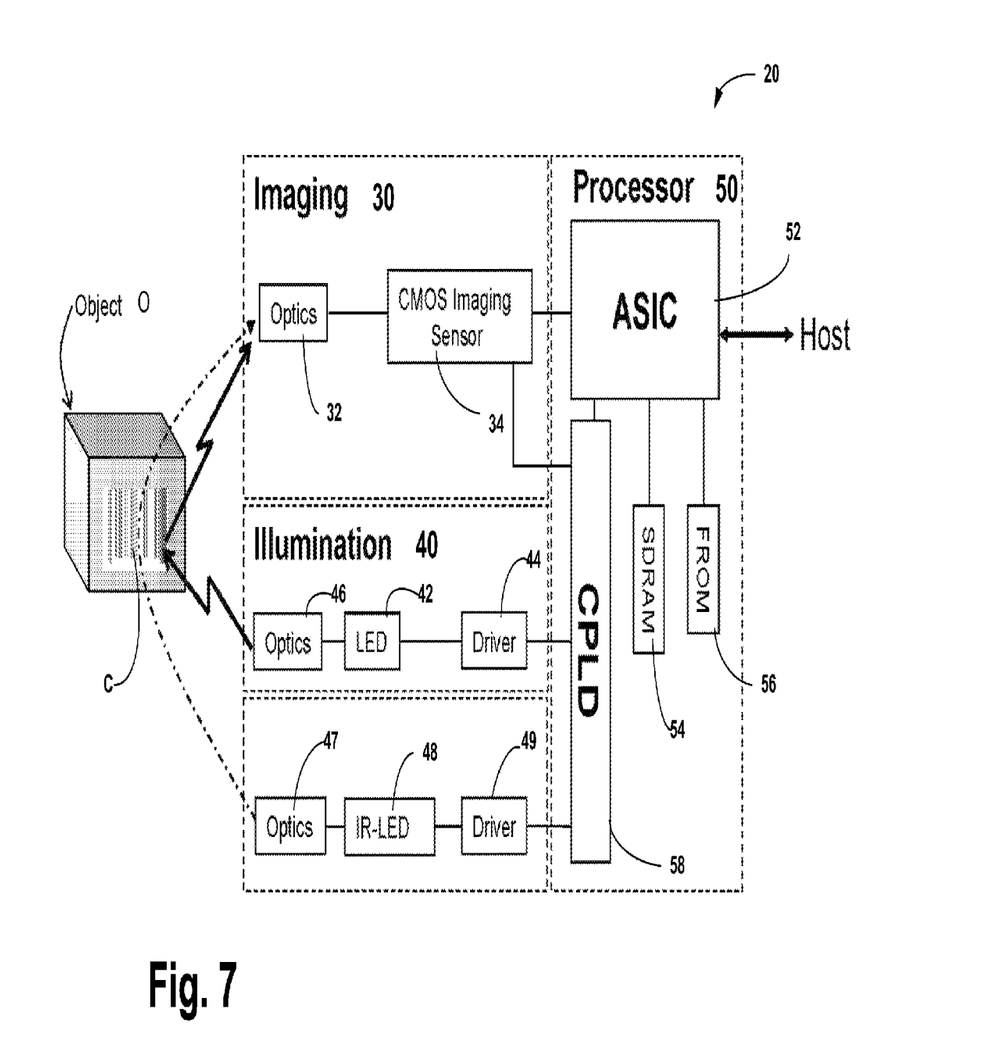
FIG. 7 is block diagram of a preferred embodiment of system 20 incorporating the present invention.

FIG. 7 is block diagram of a preferred embodiment of system 20. System 20 broadly comprises and imaging portion or subsystem 30, which forms an image of the optical code C on an object O; and illumination portion or subsystem 40, which provides both the infrared and visible illumination to produce an image of object O; and a processor portion or subsystem 50, which provides all the necessary processing for the operation of system 20.

Imaging portion 30 includes optics 32, such as a lens system, which focuses an image of the optical code C on an image sensor 34, such as a CMOS array. Such devices are well known in the art. Image sensor 34 contains an array of pixel elements storing the image which can be processed to reproduce (decode) the information in optical code C in processor portion 50.

Processor portion 50 includes an application specific integrated circuit (ASIC) 52, which processes the pixel information from image portion 30 to reproduce the information encoded in optical code C. ASIC 52 has access to random access memory (RAM, preferably SDRAM) 54 and read-only memory (ROM) 56. Processor portion 50 also includes a complex programmable logic device (CPLD) 58, which provides control signals for the illumination portion 40. CPLD 58 is programmed with the graph of FIG. 6. ASIC 52 provides a signal to CPLD 58 which represents the intensity of detected infrared radiation from point P, and CPLD 58, making use of the programmed curve of FIG. 6, produces a control signal that controls the illumination provided by illumination portion 40.

Illumination portion 40 includes an LED 42 which emits visible radiation and is driven by a driver 44 under control of CPLD 58. Illumination from LED 42 is focused by optics 46, for example a lens system. Also included in illumination portion 40 is an infrared LED 48 which is driven by a driver 49 under control of CPLD 58. Illumination from LED 48 is focused via optics 47, for example a lens system.

Operation of system 20 is as described previously with respect to FIGS. 3 and 4. Those skilled in the art will appreciate that the intensity or the duration of a visible light pulse, or both, may be controlled to achieve proper exposure.

Although a preferred embodiment of the invention has been disclosed for illustrative purposes, those skilled in the art will appreciate that many additions and modifications, and substitutions are possible without departing from the scope and spirit of the invention as defined by the accompanying claims.

What is claimed is:

1. A method for decoding an optical code on a surface of an object; said method comprising the steps of:
   directing infrared illumination generally towards the surface;
   determining a distance between the surface and an image sensor using infrared illumination reflected from the surface onto the image sensor;
   producing visible illumination in an amount corresponding to the distance determined between the surface and the image sensor and directing the visible illumination generally towards the surface to illuminate the optical code, wherein the visible illumination is a pulse, and wherein at least one of intensity and duration of the visible illumination pulse is increased with distance but maintained at substantially a constant value after a predetermined threshold is exceeded; and
   forming an image for use in decoding the optical code.

2. The method of claim 1 wherein the directing step includes controlling the infrared illumination to form a spot of infrared illumination on the object, and wherein the infrared illumination reflected from the surface onto the image sensor in the determining step comprises an image of the spot.

3. The method of claim 2 wherein the determining step includes determining the location of the image of the spot on the image sensor.

4. The method of claim 3 wherein the visible illumination pulse is controlled based upon the distance determination.

5. The method of claim 2 wherein the visible illumination pulse is controlled based upon the distance determination.

6. The method of claim 5 wherein the duration of the visible illumination pulse is increased with distance but maintained at substantially the constant value after the predetermined threshold distance is exceeded.

7. The method of claim 1 wherein the visible illumination pulse is controlled based upon the distance determination.

8. The method of claim 7 wherein the duration of the visible illumination pulse is increased with distance but maintained at substantially the constant value after the predetermined threshold distance is exceeded.

9. The method of claim 1 wherein the distance is determined by the location of the reflected infrared illumination on the image sensor.

10. An optical imaging device for decoding an optical code on a surface, the optical imaging device comprising:
   a first illumination source for illuminating the optical code with visible illumination;
   a second illumination source for illuminating the surface with infrared illumination;
   an image sensor for sensing infrared illumination reflected from the surface; and
   a processor for:
      determining a distance between the surface and the image sensor based on the reflected infrared illumination sensed by the image sensor;
      generating an illumination control signal for controlling the amount of visible illumination produced by the first illumination source according to the distance determined between the surface and the image sensor, wherein the visible illumination is a pulse, and wherein the illumination control signal controls at least one of intensity and duration of the visible illumination pulse so as to increase with distance but maintains the visible illumination pulse at substantially a constant value after a predetermined threshold distance is exceeded; and
      decoding the optical code from an image thereof.

11. The imaging device of claim 10 wherein the second illumination source produces a spot on the surface and said sensor senses an image of the infrared illuminated surface.

12. The imaging device of claim 11 wherein the processor determines said distance based on the location of an image of said spot on the image sensor.

13. The imaging device of claim 12 wherein the first illumination source produces the visible illumination pulse.

14. The imaging device of claim 11 wherein the first illumination source produces the visible illumination pulse.

15. The imaging device of claim 14 wherein the illumination control signal controls the duration of the visible illumination pulse so as to increase with distance but maintains the visible illumination pulse at substantially the constant value after the predetermined threshold distance is exceeded.

16. The imaging device of claim 10 wherein the first illumination source produces the visible illumination pulse.

17. The imaging device of claim 16 wherein the illumination control signal controls the duration of the visible illumination pulse so as to increase with distance but maintains the visible illumination pulse at substantially the constant value after the predetermined threshold distance is exceeded.

18. The imaging device of claim 10 wherein the distance is determined by the location of the reflected infrared illumination on the image sensor.

19. A symbol reading device comprising:
   a first illumination source for generating illumination of a first wavelength;
   a second illumination source for generating illumination of a second wavelength different from the first wavelength, the second illumination source for illuminating said symbol with the illumination of the second wavelength;
   a processor for measuring the distance between the device and an object bearing the symbol using a reflected portion of said illumination of the first wavelength; and
   a controller for controlling at least one of a duration and an intensity of the illumination of the second wavelength in response to the distance measured between the device and the object;
   wherein if the distance is greater than a prescribed maximum, the at least one of the duration and the intensity of the illumination of the second wavelength is not varied, and if the distance is less than the prescribed maximum, the at least one of the duration and the intensity of the illumination of the second wavelength is varied as a function of the distance.

20. The symbol reading device of claim 19 wherein said first illumination source is an infrared illumination source.

21. The symbol reading device of claim 20 wherein only the duration of said illumination of the second wavelength is controlled in response to distance.

* * * * *